US010159037B2

(12) United States Patent
Wilhelmsson et al.

(10) Patent No.: US 10,159,037 B2
(45) Date of Patent: *Dec. 18, 2018

(54) CELL SELECTION DEPENDING ON RELATIVE SPEED BETWEEN TERMINAL AND ACCESS POINT

(71) Applicant: Telefonaktiebolaget LM Ericsson (publ), Stockholm (SE)

(72) Inventors: Leif Wilhelmsson, Dalby (SE); Mattias Bergstrom, Stockholm (SE); Filip Mestanov, Sollentuna (SE); Hakan Persson, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 115 days.

This patent is subject to a terminal disclaimer.

(21) Appl. No.: 15/128,980

(22) PCT Filed: Mar. 26, 2014

(86) PCT No.: PCT/EP2014/056076
§ 371 (c)(1),
(2) Date: Sep. 25, 2016

(87) PCT Pub. No.: WO2015/144217
PCT Pub. Date: Oct. 1, 2015

(65) Prior Publication Data
US 2017/0105172 A1      Apr. 13, 2017

(51) Int. Cl.
*H04W 48/20* (2009.01)
*H04W 36/32* (2009.01)
(Continued)

(52) U.S. Cl.
CPC ........... *H04W 48/20* (2013.01); *H04W 36/32* (2013.01); *H04W 48/10* (2013.01); *H04W 76/10* (2018.02);
(Continued)

(58) Field of Classification Search
CPC ..... H04W 36/32; H04W 48/10; H04W 48/20; H04W 76/02; H04W 76/10; H04W 84/12; H04W 88/08
See application file for complete search history.

(56) References Cited

U.S. PATENT DOCUMENTS

| | | | | |
|---|---|---|---|---|
| 9,854,620 | B2 * | 12/2017 | Wilhelmsson | H04W 64/006 |
| 2010/0074221 | A1 * | 3/2010 | Hong | H04W 36/0011 |
| | | | | 370/331 |

(Continued)

FOREIGN PATENT DOCUMENTS

| | | |
|---|---|---|
| EP | 2112858 A1 | 10/2009 |
| EP | 2424321 A1 | 2/2012 |
| WO | 2011020481 A1 | 2/2011 |

OTHER PUBLICATIONS

PCT International Search Report, dated Dec. 10, 2014, in connection with International Application No. PCT/EP2014/056076, all pages.

(Continued)

*Primary Examiner* — Benjamin H Elliott, IV
(74) *Attorney, Agent, or Firm* — Leffler Intellectual Property Law, PLLC

(57) ABSTRACT

A method in a mobile terminal is disclosed for determining whether or not to transmit a connection request for a connection between the mobile terminal and a base station, where the base station is moving. When the mobile terminal is detecting the base station, the mobile terminal is determining an indication of a relative speed between the mobile terminal and the detected base station. The mobile terminal is then determining whether or not to transmit the connection request to the base station. It is determined to transmit the connection request when the determined indication of (Continued)

the relative speed between the mobile terminal and the base station indicates that the relative speed is below a first threshold.

13 Claims, 6 Drawing Sheets

(51) Int. Cl.
*H04W 76/10* (2018.01)
*H04W 48/10* (2009.01)
*H04W 84/00* (2009.01)
*H04W 84/12* (2009.01)
*H04W 88/08* (2009.01)

(52) U.S. Cl.
CPC .......... *H04W 84/005* (2013.01); *H04W 84/12* (2013.01); *H04W 88/08* (2013.01)

(56) References Cited

U.S. PATENT DOCUMENTS

| | | | |
|---|---|---|---|
| 2011/0207468 A1* | 8/2011 | Nakamura | H04W 52/0274 455/450 |
| 2011/0211458 A1* | 9/2011 | Ishii | H04W 76/19 370/242 |
| 2011/0275378 A1 | 11/2011 | Kwon et al. | |
| 2012/0058763 A1* | 3/2012 | Zhao | H04W 48/20 455/434 |
| 2012/0087303 A1 | 4/2012 | Kwon et al. | |
| 2012/0276946 A1 | 11/2012 | Sung et al. | |
| 2013/0051251 A1 | 2/2013 | Wang et al. | |
| 2013/0059589 A1 | 5/2013 | Dalsgaard et al. | |
| 2013/0115945 A1 | 5/2013 | Holostov et al. | |
| 2014/0347990 A1* | 11/2014 | Chimbili | H04W 28/08 370/235 |
| 2015/0173017 A1* | 6/2015 | Rakotoharison | H04W 8/08 370/311 |
| 2017/0105172 A1* | 4/2017 | Wilhelmsson | H04W 76/10 |
| 2017/0111954 A1* | 4/2017 | Wilhelmsson | H04W 64/006 |

OTHER PUBLICATIONS

PCT Written Opinion, dated Dec. 10, 2014, in connection with International Application No. PCT/EP2014/056076, all pages.

Hongxia Zhao et al., Handoff for Wireless Networks with Mobile Relay Stations, IEEE WCNC 2011—Network, pp. 826-831.

Yutao Sul et al., Moving Cells: A Promising Solution to Boost Performance for Vehicular Users, Heterogeneous and Small Cell Networks, IEEE Communications Magazine, Jun. 2013, pp. 62-68.

* cited by examiner

CELL SELECTION DEPENDING ON RELATIVE SPEED BETWEEN TERMINAL AND ACCESS POINT

TECHNICAL FIELD

Embodiments herein relate generally to a mobile terminal, a base station and a wireless communication system and methods therein. In particular embodiments relate to determining whether or not a mobile terminal should connect to a moving base station.

BACKGROUND

Mobile terminals for communication such as wireless devices are also known as e.g. User Equipments (UE), wireless terminals and/or mobile stations. Mobile terminals are enabled to communicate wirelessly in a wireless communications system or cellular communication network, sometimes also referred to as a cellular radio system or cellular networks. The communication may be performed e.g. between two mobile terminals, between a terminal and a regular telephone and/or between a terminal and a server via a Radio Access Network (RAN) and possibly one or more core networks, comprised within the cellular communications network.

Mobile terminals may further be referred to as mobile telephones, cellular telephones, laptops, or tablet computers with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another terminal or a server.

The wireless communication system covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or Access Point (AP), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for mobile terminals. The 3GPP has undertaken to evolve further the UTRAN and GSM based radio access network technologies.

The 3GPP LTE radio access standard has been written in order to support high bitrates and low latency both for uplink and downlink traffic. All data transmission is in LTE controlled by the radio base station.

In a wireless communication system, when a mobile terminal is connected to a base station, it is important, from a performance point of view, that the mobile terminal is connected to the most suitable base station. Often the most suitable base station is the one from which the mobile terminal receives the best signal quality and/or strongest received signal strength. Better signal quality and/or strongest received signal strength in general means that a higher data rate can be supported, that the delay is smaller, and/or in general that the relevant Quality of Service (QoS) is better. When the wireless communication system is heavily loaded, it may not be enough to only consider the Signal quality and/or received signal strength as there simply will not be sufficient available resources. These resources may either be in an access link between the mobile terminal and the base station, and/or it may be in the wireless communication system connecting different base stations to each other.

In practise, to ensure that the mobile terminal is connected to the most suitable base station, the mobile terminal may scan for signals from different base stations within radio range and then try to connect to most suitable base station. Here, most suitable base station may for instance be the base station that is expected to provide the best QoS for the mobile terminal.

As the mobile terminal moves, it may find that the base station it is presently connected to is no longer the most suitable, and therefore the mobile terminal may be handed over from one base station to another. This Handover (HO) procedure target is that the mobile terminal is always connected to the most suitable base station. However, the HO procedure comes at a cost as the mobile terminal needs to perform measurements, which are of no use in case a HO will not be performed, and it also takes resources from the wireless communication system to perform the handover.

In addition, for certain applications with stringent requirements a HO may be hard to perform without causing a glitch or interruption in the communication. For this reason, it may actually be preferred that the mobile terminal remains connected to one base station for a longer time than to continuously perform handovers between different base stations just to ensure that the mobile terminal is connected to the very best one. Specifically, in case the mobile terminal is moving fast and the coverage area of the base station is small it is not a good solution to connect to another base station, even if the signal quality would be better, as the time duration between HOs in this case may be expected to be rather small. To address this problem, the wireless communication system should preferably have at least some cells that are large, i.e., macro cells, which fast moving mobile terminals may connect to, whereas slowly moving or stationary mobile terminals may connect to smaller cells, for instance micro- or pico cells. In case the mobile terminal is in idle mode and performs cell reselection similar aspects apply.

Today, some mobile terminals support several Radio Access Technologies (RAT), and in particular cellular access standards such as WCDMA and LTE as well as Wireless Local Area Network (WLAN) access are supported. This means that when the mobile terminal is scanning for being connected to the most suitable base station it may be even more challenging as the base station may either be a WLAN Access Point (AP) or a base station in a cellular communications network. Typically the WLAN AP will have a rather limited coverage area, and therefore it is not suitable for the mobile terminal to connect to the WLAN AP if the mobile terminal is moving fast. In fact, in order to save power, the mobile terminal may determine not to scan for WLAN APs when the mobile terminal is moving fast because it may then result in two HOs, i.e. one to and one from the WLAN AP, and the mobile terminal is only able to stay connected to the WLAN AP for a very short time.

As mentioned above, to ensure that the mobile terminal is connected to the most suitable base station, the mobile terminal may scan for signals from different base stations within radio range trying to connect to the most suitable one. However, as scanning consumes power, scanning for small cells such as e.g. WLAN APs are typically avoided unless necessary. In particular this may be the preferred setting in case it is known that the mobile terminal is moving at relatively high speed.

A problem is that when also the base stations are moving in the wireless communication system it is difficult to decide which mobile terminal that shall connect to which base station.

SUMMARY

It is therefore an object of embodiments herein to provide a way of improving the performance of a wireless communication system.

According to a first aspect of embodiments herein the object is achieved by a method in a wireless communication system for determining whether or not to transmit a connection request for a connection between a mobile terminal and a base station where the base station is moving.

The base station transmits, and the mobile terminal receives information about a duration during which the base station shall be detected by the mobile terminal before the mobile terminal transmits a connection request to the base station.

The mobile terminal determines an indication of the relative speed between the mobile terminal and the detected base station.

The mobile terminal determines, based on the indication of the relative speed, whether or not to transmit the connection request to the base station, wherein it is determined to transmit the connection request when the determined indication of the relative speed between the mobile terminal and the base station indicates that the relative speed is lower than a threshold.

According to a second aspect of embodiments herein, the object is achieved by a method in a mobile terminal for determining whether or not to transmit a connection request for a connection between the mobile terminal and a base station, where the base station is moving.

The mobile terminal determines an indication of the relative speed between the mobile terminal and the detected base station.

The mobile terminal determines based on the indication of the relative speed whether or not to transmit the connection request to the base station. It is determined to transmit the connection request when the determined indication of the relative speed between the mobile terminal and the base station indicates that the relative speed is below a first threshold.

According to a third aspect of embodiments herein the object is achieved by a method in a base station for assisting the mobile terminal to determine whether or not to transmit a connection request for a connection between the mobile terminal and the base station where the base station is moving.

The base station transmits information to the mobile terminal about duration during which the base station shall be detected by the mobile terminal before the mobile terminal transmits a connection request to the base station. The information about the duration enables the mobile terminal to determine whether or not to transmit the connection request based on the transmitted duration value.

According to a fourth aspect of embodiments herein the object is achieved by a mobile terminal adapted to determine whether or not to transmit a connection request for a connection between the mobile terminal and a base station where the base station is movable.

The mobile terminal comprises a control unit adapted to, when detecting the base station, determine an indication of a relative speed between the mobile terminal and the detected base station.

The control unit is adapted to determine whether or not to transmit the connection request to the base station, and where it is determined to transmit the connection request when the determined indication of the relative speed between the mobile terminal and the base station indicates that the relative speed is below a first threshold.

According to a fifth aspect of embodiments herein the object is achieved by a base station adapted to assist a mobile terminal in determining whether or not to transmit a connection request for a connection between the mobile terminal and the base station where the base station is movable.

The base station comprises a control unit adapted to transmit a threshold to the mobile terminal indicating an amount of time during which the base station shall be detected by the mobile terminal before the mobile terminal transmits a connection request to the base station.

According to a sixth aspect of embodiments herein the object is achieved by a computer program product comprising computer program code for executing the method in the mobile terminal when said computer program code is executed by a programmable control unit of the mobile terminal.

According to a seventh aspect of embodiments herein the object is achieved by a non-transitory computer readable medium having stored thereon a computer program product comprising computer program code for executing the method in the mobile terminal when said computer program code is executed by a programmable control unit of the mobile terminal.

According to an eighth aspect of embodiments herein the object is achieved by a computer program product comprising computer program code for executing the method in the base station when said computer program code is executed by a programmable control unit of the base station.

According to a ninth aspect of embodiments herein the object is achieved by a non-transitory computer readable medium having stored thereon a computer program product comprising computer program code for executing the method in the base station when said computer program code is executed by a programmable control unit of the base station.

Since the mobile terminal is able to determine whether or not to transmit the connection request to the base station, based on the indication of the relative speed between the mobile terminal and the base station, it is possible to transmit the connection request to the base station only when the relative speed between the mobile terminal and the base station is low. This result in that the performance of the wireless communication system is improved since less hand overs between the mobile terminal and the base stations is needed.

An advantage with embodiments herein is that less signaling is needed in the wireless communication system since fewer connection requests are sent.

Another advantage with embodiments herein is that the channel conditions for the mobile terminal are improved since the mobile terminal will be connected to the most suitable base station.

A further advantage with embodiments herein is that power consumption of the mobile terminal is decreased since the mobile terminal may transmit with lower power.

A further advantage is that the probability of connecting to an unsuitable AP is reduced.

A further advantage is that system resources are better utilized.

BRIEF DESCRIPTION OF THE DRAWINGS

Examples of embodiments herein are described in more detail with reference to attached drawings in which.

DETAILED DESCRIPTION

Figure 1:
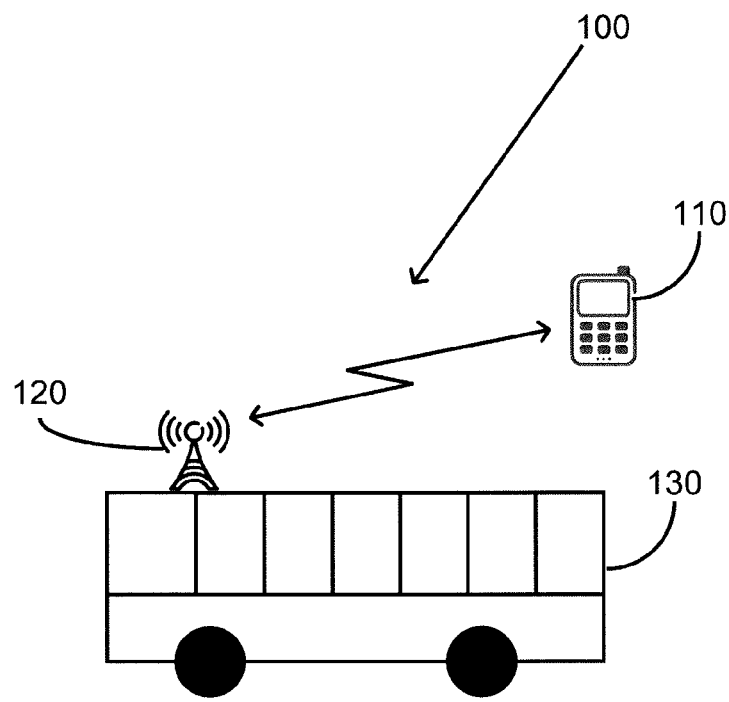
FIG. 1 is a schematic block diagram illustrating the wireless communication system.

As part of developing embodiments herein, some problems will first be identified and discussed.

The inventors have realized that there exist problems with existing solutions for which it is determined whether a connection to a certain base station is suitable or not based on the speed of the mobile terminal and knowledge of the size of the cell covered by the base station. For example, in case also the base station is moving, this will not give the desired result concerning if it is suitable for a certain mobile terminal to connect to the base station. In particular this is the case when the mobile terminal and the base station are moving together, which for instance would be the case if both were located on a moving vehicle.

Prior art algorithms for managing HO between different base stations might not work satisfactory, and in particular the idea that a fast moving mobile terminal should not scan for WLAN APs may in fact cause a significant reduction in performance. Furthermore, even for the approach that scanning should not be performed until it is determined that the present base station no longer can provide the required QoS implies a problem. The reason is that when the mobile terminal is moving within e.g. a bus or a train, channel conditions between the mobile terminal and a base station placed on the bus or train are typically not very good. First, the channel will be fast fading which makes reception more challenging. Second, the signal will be significantly attenuated when going through the wall or roof of the bus or train so that the received signal strength will be weak. This means that the transmitted power of the mobile terminal will be high and thus the power consumption will also be high.

It should be noted that when the term handover or HO is used herein that does not necessarily mean a handover as defined in the 3GPP specifications. The term handover or HO is used in a broader sense and may also refer to when ongoing traffic or later arriving traffic of the mobile terminal is steered from a 3GPP network to a WLAN or vice versa.

A HO is typically triggered when the current connection between the base station and the mobile terminal is considered not to be sufficiently good, e.g. below a threshold, or because a load for that particular base station is too high, e.g. above a threshold. The HO may be triggered by either the base station or the mobile terminal. The need for a HO may be predicted based on how fast the mobile terminal is moving and the coverage area of the base station. Because a HO requires signalling and other resources and increases power consumption, it is desirable to limit the number of HOs. One approach for achieving this is to have a layered network were mobile terminals moving at high speed are connected to base stations with large cells, whereas slowly moving and stationary users are connected to base stations with small cells. Specifically, when the mobile terminal is moving and needs to perform a HO, the mobile terminal may perform measurements and report a signal quality for different base stations to the wireless communication system. The wireless communication system, or a network node in the wireless communication system, may then decide which is the most suitable target base station for the HO. The base station may then take into account that if the mobile terminal is moving, it may be preferable to connect to the base station supporting a larger area although there may be other base stations with better signal quality but with smaller coverage area. Such a decision is quite easily made when the base stations are stationary.

However, there is an increasing number of moving base stations as more and more vehicles such as e.g. buses and trains are equipped with WLAN. For this scenario, algorithms for HO which are designed for stationary base stations are not always working well.

FIG. 1 depicts an example of a wireless communication system 100 according to a scenario in which embodiments herein may be implemented. The wireless communication system 100 is a wireless communication network such as an LTE, WCDMA, GSM network, WLAN network, or any other wireless communication system.

A mobile terminal 110 operates in the wireless communication system 100. The mobile terminal 110 may e.g. be a mobile phone a wireless device, a user equipment, a mobile wireless terminal, a wireless terminal, a WLAN station, a computer such as e.g. a laptop, a Personal Digital Assistants (PDA)s or a tablet computer with wireless capability, or any other radio network unit capable to communicate over a radio link in the wireless communication system 100. Please note the term mobile terminal 110 used in this document also covers other wireless devices such as Machine to machine (M2M) devices, sometimes referred to as "machine type communication", MTC, devices.

The wireless communication system 100 comprises at least one base station 120 which is movable. The geographical area where radio coverage is provided from the base station 120 will be referred to as a cell. The base station 120 may be a transmission point, a radio base station, a Node B, an eNB, an eNodeB, a WLAN AP, a Home Node B, an Home eNode B or any other network node capable to serve the mobile terminal 110 in the wireless communication system 100.

As stated above the base station 120 is movable. The base station 120 may e.g. be placed on a vehicle 130 such as a car, a bus, a boat, an airplane or a train. In this figure, the base station 120 is located on the outside of a bus mainly for illustration purposes. Typically, the base station 120 would be located inside the moving vehicle, although the disclosed ideas are applicable regardless of whether the base station 120 is located on the inside of the vehicle or on the outside. The base station 120 preferably has a relatively small coverage area only serving mobile terminals 110 in the vicinity of the vehicle 130. The base station 120 may preferably have an antenna within the vehicle 130 for serving the mobile terminals such as the mobile terminal 110 within the vehicle 130. The base station 120 may further have an external antenna e.g. on the roof of the vehicle 130, such as for communicating with other nodes in the wireless communication system 100.

There are an increasing number of small cells, in particular small cells served by WLAN APs that are not stationary but instead movable, e.g. installed on buses, on trains, or in some other way such that the cell is far from being stationary. Embodiments herein provide algorithms for performing handover and cell selection and/or reselection, when the base station 120 is not stationary. An example of when embodiments herein are applicable is in a situation when the base station 120 is deployed on board of the vehicle 130 as shown in FIG. 1. When the vehicle 130 makes a stop e.g., at a traffic light, and the mobile terminal 110 is not in the bus but in the vicinity of the bus, e.g. in another vehicle. In this case the mobile terminal 110 may pick up a signal level from the base station 120 and try to connect to it. Since the mobile terminal 110 is in another vehicle than the base station 120 it will probably move in another direction than the base station 120 and a set up connection to the base station 120 will therefore be lost. According to embodiments herein, it will be decided that the mobile terminal 110 should not connect to the base station 120 in that case. This decision may e.g. be based on the relative speed between the mobile terminal 110 and the base station 120. This will be positive with regards to signalling, power consumption, user experience, etc.

Embodiments will be exemplified in a non-limiting description.

Figure 2:
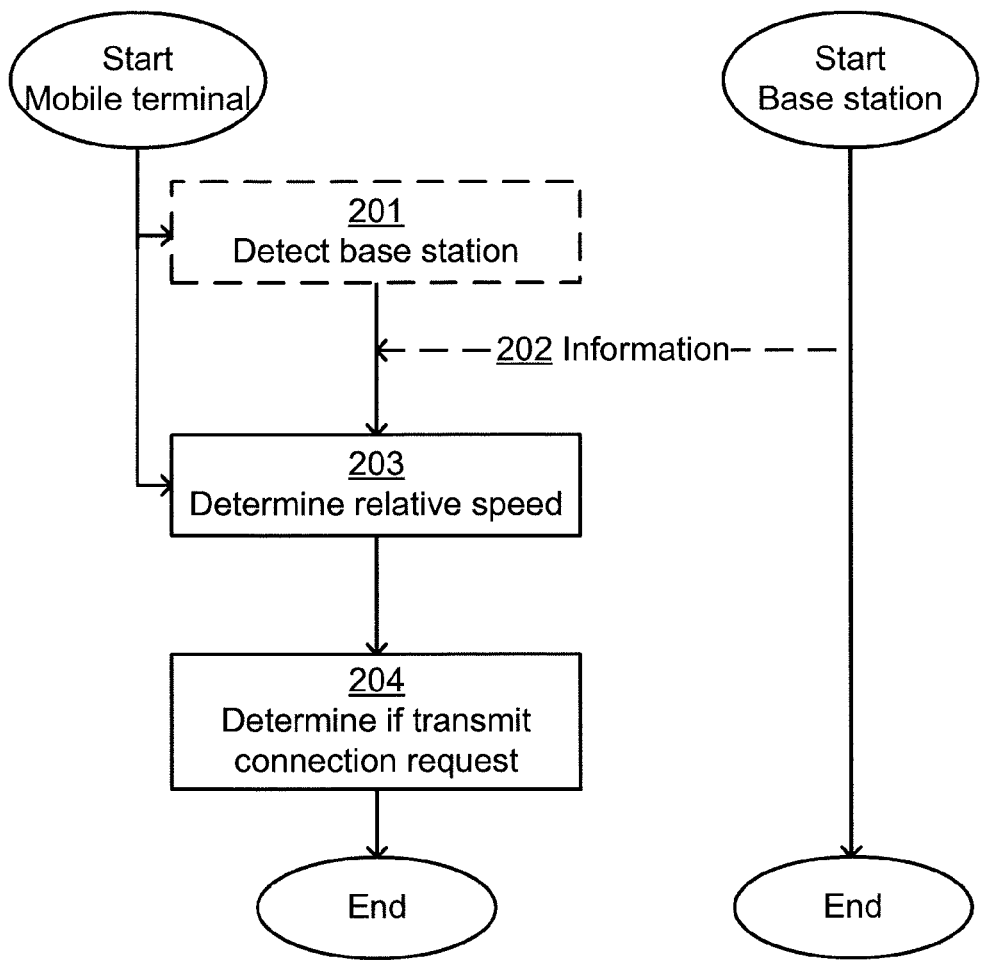
FIG. 2 is a signaling diagram depicting embodiments of a method in the wireless communication system.

Example embodiments of a method in the wireless communication system 100 for determining whether or not to transmit a connection request for a connection between the mobile terminal 110 and the base station 120, will now be described with reference to a flowchart depicted in FIG. 2. As mentioned above the base station 120 is moving.

The method comprises the following actions, which actions may be taken in any suitable order. The actions may also be combined. Dashed lines of some boxes in FIG. 2 indicate that this action is not mandatory.

Action 201

The mobile terminal 110 is continuously measuring the signal quality from neighbor base stations 120, to find a potential handover candidate. When the mobile terminal 110 detects the base station 120, the mobile terminal 110 is required to decide if a connection shall be set up and a connection request shall be transmitted to the base station 120. This will be decided in action 204. The mobile terminal 110 first have to find a basis for that decision.

Action 202

A basis for the decision may be that the mobile terminal 110 determines if the mobile terminal 110 and the base station are moving jointly. In that case a connection shall be decided to be set up between the base station 120 and the mobile terminal 110 which can be expected to last for a while and not be lost soon since they are moving jointly. It may be so that the mobile terminal 110 considers also other conditions when determining whether or not to connect to the base station 120. Other examples of condition that are used when determining whether or not to connect to the base station 120 may be that the load of the base station 120 is below a threshold or that the amount of data in the mobile terminal 110 which needs to be served exceeds a threshold, etc.

One way of determining the indication of a relative speed is to use a duration e.g. starting from when the base station 120 is detected for the first time. If the mobile terminal 110 can hear i.e. receive signals from the base station 120 during this duration, this is an indication that the relative speed is low. It may be so that the terminal will consider that it receives signals from the base station only if the signal strength or other signal related metric is above a certain threshold for the duration. However if the mobile terminal 110 can no longer hear the base station 120 during the time interval, this is an indication that the relative speed is high. Thus, in some embodiments, the base station 120 transmits the information about the duration which is received by the mobile terminal 110. The information indicates the duration during which the mobile terminal 110 shall receive signals from the base station 120 before the mobile terminal 110 transmits a connection request to the base station 120. The duration indicates how long time the mobile terminal 110 should wait until the connection request may be transmitted to the base station 110. During the duration the mobile terminal 110 shall not transmit the connection request.

It may be an indication that the mobile terminal 110 and the base station 120 moves jointly if the mobile terminal 110 still may receive signals from the base station 120 after the threshold duration.

Action 203

Thus the mobile terminal 110 determines an indication of the relative speed between the mobile terminal 110 and the detected base station 120 based on the duration. There are several ways to do this. Examples will be given below with respect to the description of FIG. 3. The indication of the relative speed may be a numerical value e.g. measured in meters per second or just a single bit indicating whether or not the mobile terminal 110 and the base station 120 are moving jointly or anything in between. The mobile terminal 110 uses the duration during which the base station 120 has been detected by the mobile terminal 110 to determine the relative speed between the mobile terminal 110 and the base station 120. If the base station 120 has been detectable for a long time, this may be an indication that the relative speed between the mobile terminal 110 and the base station 120 is low.

Action 204

The mobile terminal 110 determines whether or not to transmit the connection request to the base station 120 based on the indication of the relative speed between the mobile terminal 110 and the detected base station 120.

The mobile terminal 110 determines to transmit the connection request when the determined indication of the relative speed between the mobile terminal 110 and the base station 120 indicates that the relative speed is lower than a threshold. The threshold may be the same as the first threshold below. The threshold may typically be related to the expected speed of the base station 120, for example if a base station 120 is deployed on a train the threshold may be set such that a mobile terminal 110 moving relative to the base station 120 with the speed of a train should not connect since the mobile terminal 110 would likely not be in the train. However, the threshold may be set considering also that the mobile terminal 110 may be carried around in the train by the users and hence the threshold could be set such that the mobile terminal should connect and/or route traffic over the base station 120 if the relative speed is walking speed, but if the speed is higher the mobile terminal should not connect and/or route traffic over the base station 120.

Figure 3:
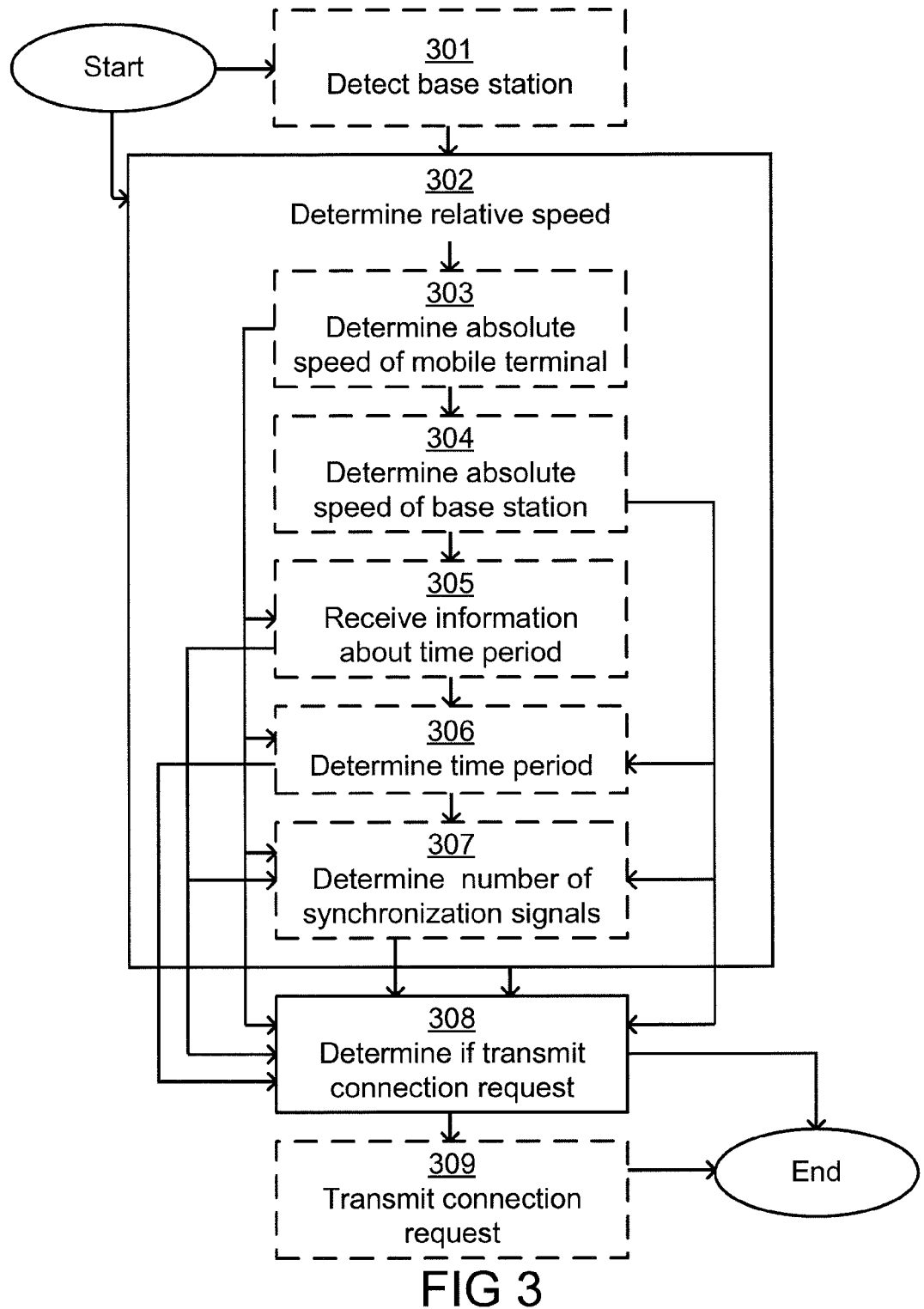
FIG. 3 is a flowchart depicting embodiments of a method in the mobile terminal.

Example embodiments of method in the mobile terminal 110 for determining whether or not to transmit the connection request for a connection between the mobile terminal 110 and the base station 120 will now be described with reference to a flowchart depicted in FIG. 3. As mentioned above the base station 120 is moving.

The method comprises the following actions, which actions may be taken in any suitable order. The actions may also be combined. Dashed lines of some boxes in FIG. 3 indicate that this action is not mandatory.

Action 301

The mobile terminal 110 is measuring the signal quality from neighbor base stations 120 to find a potential handover candidate. A potential handover candidate is detected when the mobile terminal 110 may decode a broadcast signal from the base station 120. When the mobile terminal 110 detects the base station 120, the mobile terminal 110 may require to decide if a connection request should be sent or not to the base station 120. How this is decided will be described below. The decision whether or not to transmit the connection request may also be taken later.

Action 302

As described above it is most favorable for the mobile terminal 110 to connect to the moving base station 120 when the mobile terminal 110 and the base station 120 are moving jointly.

According to embodiments herein the mobile terminal 110, when determining if a certain base station, such as the base station 120, is suitable to connect to or not, first determines or estimates the relative speed between the mobile terminal 110 and the base station 120. Rather than only basing the decision to transmit the connection request on the absolute speed of the mobile terminal 110, the mobile terminal 110 will base the decision on a relative speed between the mobile terminal 110 and the base station 120. The decision will be made in action 308 below.

Thus, when detecting the base station 120, the mobile terminal 110 first determines an indication of a relative speed between the mobile terminal 110 and the detected base station 120. This may be determined in a variety of ways. Some of them will be described in the sub-actions 303-307 below. The indication of the relative speed may be a numerical value measured in meters per second or just a single bit indicating whether or not the mobile terminal 110 and the base station 120 are moving jointly or anything in between or similar.

Action 303

One way to determine the relative speed between the mobile terminal 110 and the base station 120 may be to first determine an indication of an absolute speed of the mobile terminal 110. This may e.g. be determined by a positioning system such as Global Positioning System (GPS), or Long Term Evolution Observed Time Difference Of Arrival (LTE OTDOA), etc.

When the mobile terminal 110 is close to the base station 120 that it is moving along with, connecting to the base station 120 would be very beneficial. In particular, the faster the mobile terminal 110 and the base station 120 are moving, the more beneficial it becomes for the mobile terminal 110 to connect to the base station 120. The reason for this is that channel conditions between the mobile terminal 110 and a base station 120 which the mobile terminal 110 does not move jointly with, such as a stationary base station which the terminal passes in a vehicle, are more challenging the faster the mobile terminal 110 is moving.

Action 304

The mobile terminal 110 may then determine an indication of an absolute speed of the base station 120. The base station 120 may for instance determine the absolute speed based on GPS, or if located on a bus in principle get this information from the bus itself. Other alternatives for obtaining the absolute speed may be used as well. The mobile terminal 110 may compare the absolute speed of the mobile terminal 110 with the absolute speed of the base station 120 to determine the relative speed.

Action 305

One way to determine the relative speed between the mobile terminal 110 and the base station 120 may be to determine a duration during which the mobile terminal 110 has been able to detect a signal from the base station 120. The duration may be defined as a time period or as a number of received synchronization signals. If the determined duration is large it is more likely that the relative speed between the mobile terminal 110 and the base station 120 is small. As an example, if the coverage of the signal from the base station 120 is a 12.5 meters radius and one requires that the signals should be detected for at least one second, a connection attempt will not be made if the speed is more than 25 m/s or 90 km/h. Information about the duration may be received from the base station 120 indicating the duration during which a signal from the base station 120 should be detectable by the mobile terminal 110 before the connection request is transmitted by the mobile terminal. Instead of requiring that the signal should be detectable during a certain duration, one may instead require that the signal quality, e.g. Received Signal Strength Indicator, RSSI, should not change more than a predetermined value during a certain period. As an example, the RSSI should not change more than 10 dB during a time duration of 100 ms. This could be seen as a generalization of the approach that it should be possible to detect the signal. Below the description is made for the case of a detectable signal, but as is easily understood by a person skilled in the art, it also applies to the more general case that the signal quality should not change more than a predetermined value.

The information about the duration may be transmitted in a broadcast manner. The base station 120 signalling the information to the mobile terminal 110 has the benefit that the base station 120 may adjust the duration depending on the absolute speed of the base station 120. For example, if the base station 120 is not moving then the base station 120 may set the duration to a low value which would then make the mobile terminal 110 do a HO to the base station 120 shortly after it has been detected. If the base station 120 is moving, the base station 120 may set the duration to a larger value so that it is unlikely that a stationary mobile terminal will do a HO to the base station 120. This may be the case when the base station 120 is passing by the mobile terminal 110.

Signalling the duration as described above prevents stationary mobile terminals to connect to a moving base station 120 which passes by. However, it also causes an increased connection delay for mobile terminals 110 moving jointly with the base station 120. In many situations this may be acceptable. However, in another embodiment, intended to address the above mentioned connection delay, the duration may be signalled from the base station 120 to the mobile terminal 110 such that a different duration may be used depending on the speed of the mobile terminal 110. The duration may e.g. be 1 s.

Specifically, a smaller duration may be used the faster the mobile terminal 110 is moving. The rational for this is as follows. If the mobile terminal 110 is moving fast, there is no need to wait a long time before connecting. This is because if the base station 120 is not moving, the mobile terminal 110 will not be able to detect the base station 120 during a very long time so that a decision may then be made much faster regarding whether or not the mobile terminal 110 and the base station 120 are moving jointly.

Action 306

The mobile terminal 110 determines the duration during which the base station 120 is detected by the mobile terminal 110. This may be determined by starting a timer, when the base station 120 is detected. Another way is to start the timer when the mobile terminal 110 needs to do a HO. The duration may be predefined in the mobile terminal 110, for example by being specified in a specification or received from the base station 120 as described above. Different durations may be used depending on the speed of the terminal 110 and/or the speed of the base station 120.

Action 307

Instead of waiting a fixed duration, i.e. the duration, another way to determine the duration during which the base station 120 has been detected by the mobile terminal 110 may be performed by determining a number of synchronization signals received from the base station 120. Thus, the number of synchronization signals defines the duration.

If the base station 120 is a WLAN AP the synchronization signals received from the base station 120 may be beacon signals received from the WLAN AP. The beacon signal is typically sent every 100 ms, and it may then for instance be required that at least, say, 5 beacons have been detected with a predetermined quality before a connection request is transmitted.

Action 308

Now, the mobile terminal 110 determines whether or not to transmit the connection request to the base station 120 based on the indication of the relative speed. This may be determined in a variety of ways and some of them are described below. Please note that these are just examples and as an example it considers that the mobile terminal 110 takes into account different methods separately, which may not necessarily be the case. If several options are available the mobile terminal 110 may take into account one, several or all of the available options when determining whether or not to transmit the connection request to the base station 120. The determination may also be made by a combination of the examples below.

It may be determined to transmit the connection request when the determined indication of the relative speed between the mobile terminal 110 and the base station 120 indicates that the relative speed is below a first threshold. The first threshold may e.g. be around walking speed as this would ensure that for example a user walking in a train with the mobile terminal 110 would connect to and/or route traffic over the base station 120 on the train while a mobile terminal 110 which the train and the base station 120 is passing by would not connect to and/or steer traffic over the base station 120 assuming that the relative speed of the base station 120 on the train and the mobile terminal 110 outside the train is above walking speed.

It may be determined to transmit the connection request when the determined indication of the relative speed indicates that the mobile terminal 110 and the base station 120 move jointly.

It may be determined to transmit the connection request when the indication of the absolute speed of the mobile terminal 110 indicates that the absolute speed of the mobile terminal 110 is larger than a second threshold. The second threshold may e.g. be a typical speed of a train or other vehicle that the terminal may travel with. When the mobile terminal 110 is close to the base station 120 that it is moving along with, connecting to the base station 120 would be very beneficial. In particular, the faster the mobile terminal 110 is moving, the more beneficial it becomes as a connection to a stationary base station 120 is more and more challenging the faster the mobile terminal 110 is moving.

It may be determined to transmit the connection request when the indication of the absolute speed of the base station 120 indicates that the absolute speed of the base station 120 is larger than a third threshold. The third threshold may e.g. be a speed large enough so that it is judged that a stationary mobile terminal should not connect to the base station 120.

It may be determined to transmit the connection request when the determined duration exceeds a fourth threshold. The mobile terminal 110 may start a timer when detecting a signal from the base station 120 and the mobile terminal 110 will transmit the connection request to the base station 120 when the duration exceeds the fourth threshold. Alternatively, instead of starting the timer upon detection of the signal from the base station 120, the timer is started at the time when a HO attempt to the base station 120 should be performed. For example, the mobile terminal 110 may have been close to the base station 120 node for a while and has then potentially detected the base station 120 but the mobile terminal 110 may not have needed to connect to the base station 120 due to traffic inactivity or due to receiving sufficient user experience from another network node. However, a decision has been made by the mobile terminal 110 itself or by the wireless communication system 100 to connect to the base station 120 and the mobile terminal 110 would then start the timer.

Action 309

If it is determined in action 308 that a connection request should be transmitted from the mobile terminal 110 to the base station 120, the mobile terminal 110 transmits the connection request.

Figure 4:
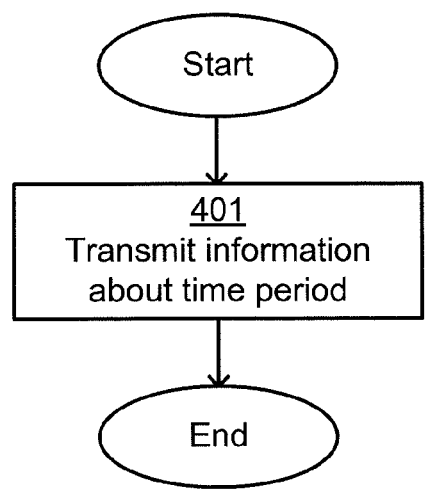
FIG. 4 is a flowchart depicting embodiments of a method in the base station.

Example embodiments of a method in the base station 120 for assisting the mobile terminal 110 in determining whether or not to transmit the connection request for a connection between the mobile terminal 110 and the base station 120 where the base station 120 is moving will now be described with reference to a flowchart depicted in FIG. 4.

Action 401

The base station 120 transmits information to the mobile terminal 110 about a duration during which the base station 120 should be detected by the mobile terminal 110 before the mobile terminal 110 transmits the connection request to the base station 120. The information about the duration may be the same as the information received by the mobile terminal 110 in action 305 above. The mobile terminal 110 may then use the duration to determine whether or not to transmit the connection request based on the transmitted duration.

In some embodiments the duration may be defined by a time period.

In some embodiments the duration may be defined by a number of synchronization signals.

Figure 5:
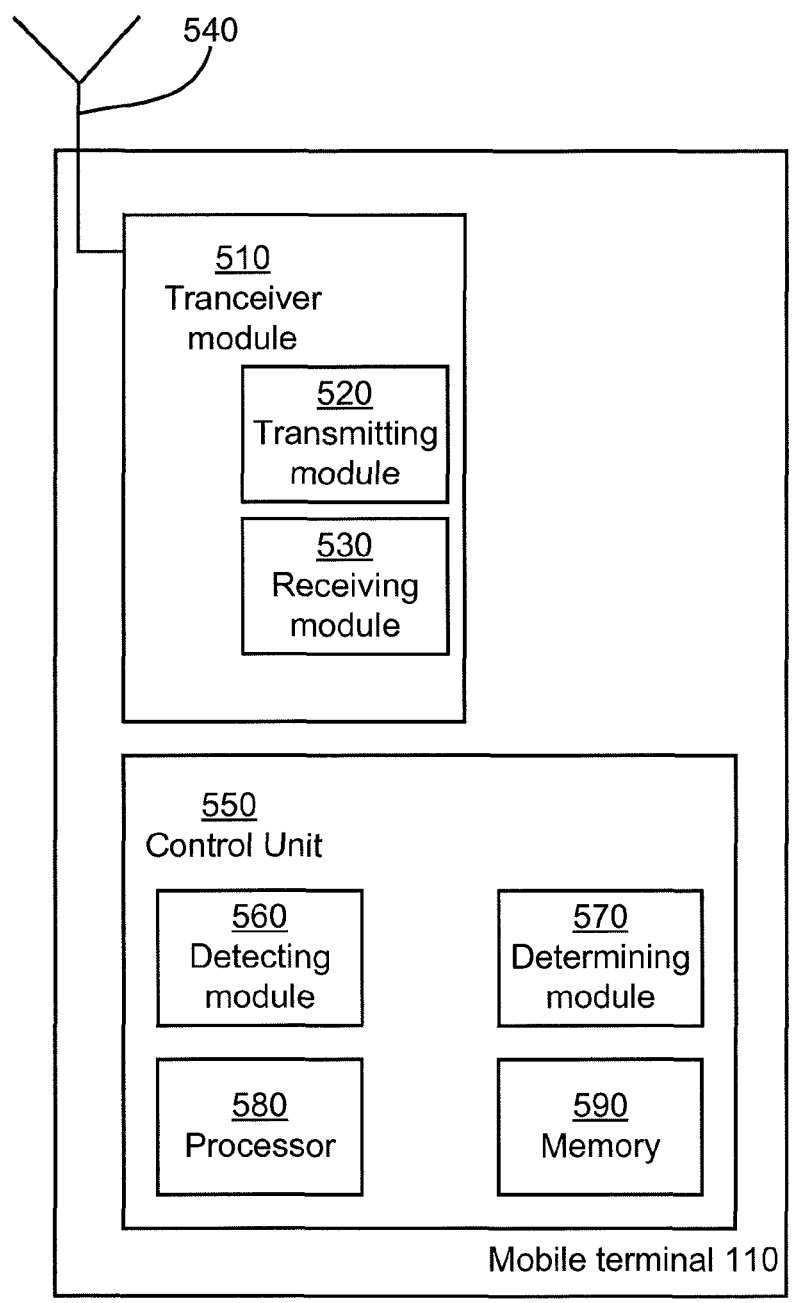
FIG. 5 is a schematic block diagram illustrating the mobile terminal according to some embodiments.

To perform the method actions for determining whether or not to transmit the connection request for the connection between the mobile terminal 110 and the base station 120 described above in relation to FIG. 3, the mobile terminal 110 may comprise the following arrangement depicted in FIG. 5. As mentioned above, the base station 120 is movable.

In some embodiments the mobile terminal 110 comprises a transceiver module 510 comprising a transmitting module 520 and a receiving module 530. The transceiver module 510 handles communications between the base station 120 and the mobile terminal 110. The transmitting module 520 handles uplink traffic and the receiving module 530 handles downlink traffic. An antenna 540 is connected to the transceiver module 510.

The mobile terminal 110 comprises a control unit 550, adapted to detect the base station 120 e.g. via a detecting module 560. The detecting module 560 may e.g. be the receiving module 530.

The control unit 550 may further be adapted to determine an indication of a relative speed between the mobile terminal 110 and the detected base station 120. For example a determining module 570 within the base station 110, may be adapted to determine the indication of the relative speed between the mobile terminal 110 and the detected base station 120.

The control unit 550 may further be adapted to determine whether or not to transmit the connection request to the base station 120, and where it is determined to transmit the connection request when the determined indication of the relative speed between the mobile terminal 110 and the base station 120 indicates that the relative speed is below a first threshold. For example the determining module 570 within the base station 110, may be adapted to determine whether or not to transmit the connection request to the base station 120.

The control unit 550 may further be adapted to determine whether or not to transmit the connection request to the base station 120 and where it is determined to transmit the connection request when the determined indication of the relative speed indicates that the mobile terminal 110 and the base station 120 moves jointly. For example the determining module 570 within the base station 110, may be adapted to determine whether or not to transmit the connection request to the base station 120.

The control unit 550 may further be adapted to determine an indication of an absolute speed of the mobile terminal 110; and where it is determined to transmit the connection request when the indication of the absolute speed of the mobile terminal 110 indicates that the absolute speed of the mobile terminal 110 is larger than a second threshold. For example the determining module 570 within the base station 110, may be adapted to determine the indication of an absolute speed of the mobile terminal 110. The determining module 570 may also be adapted to determine whether or not to transmit the connection request to the base station 120.

The control unit 550 may further be adapted to determine an indication of an absolute speed of the base station 120; and where it is determined to transmit the connection request when the indication of the absolute speed of the base station 120 indicates that the absolute speed of the base station 120 is larger than a third threshold. For example the determining module 570 within the base station 110, may be adapted to determine the indication of an absolute speed of the base station 120. The determining module 570 may also be adapted to determine whether or not to transmit the connection request to the base station 120.

The control unit 550 may further be adapted to determine a duration during which the base station 120 has been detected by the mobile terminal 110; and where it is determined to transmit the connection request when the determined duration exceeds a fourth threshold. For example the determining module 570 within the base station 110, may be adapted to determine the duration during which the base station 120 has been detected by the mobile terminal 110. The determining module 570 may also be adapted to determine whether or not to transmit the connection request to the base station 120.

The control unit 550 may further be adapted to receive the information about the duration from the base station 120. For example the control unit 550 may be adapted to receive the information about the duration from the base station 120 via the receiving module 530 within the base station 110.

The control unit 550 may further be adapted to determine the duration during which the base station 120 has been detected by the mobile terminal 110 by determining a number of synchronization signals received from the base station 120. For example the determining module 570 within the base station 110, may be adapted to determine the duration during which the base station 120 has been detected by the mobile terminal 110 by determining a number of synchronization signals received from the base station 120

In some embodiments, the control unit 550 may be implemented as a dedicated application-specific hardware unit. Alternatively, said control unit 550, or parts thereof, may be implemented with programmable and/or configurable hardware units, such as but not limited to one or more Field-Programmable Gate Arrays (FPGAs), processors, or microcontrollers. Thus, the control unit 550 may be a programmable control unit. The control unit 550 and a memory module 590 may perform the actions of the detecting module 560, and the determining module 570 described above.

The base station 120 may further comprise the memory module 590 comprising one or more memory units. The memory module 590 may comprise instructions executable by the programmable control unit 550.

The memory module 590 may be arranged to be used to store, data, configurations, schedulings, and applications to perform the methods herein when being executed in the base station 120, e.g. by the control unit 550.

Figure 6:
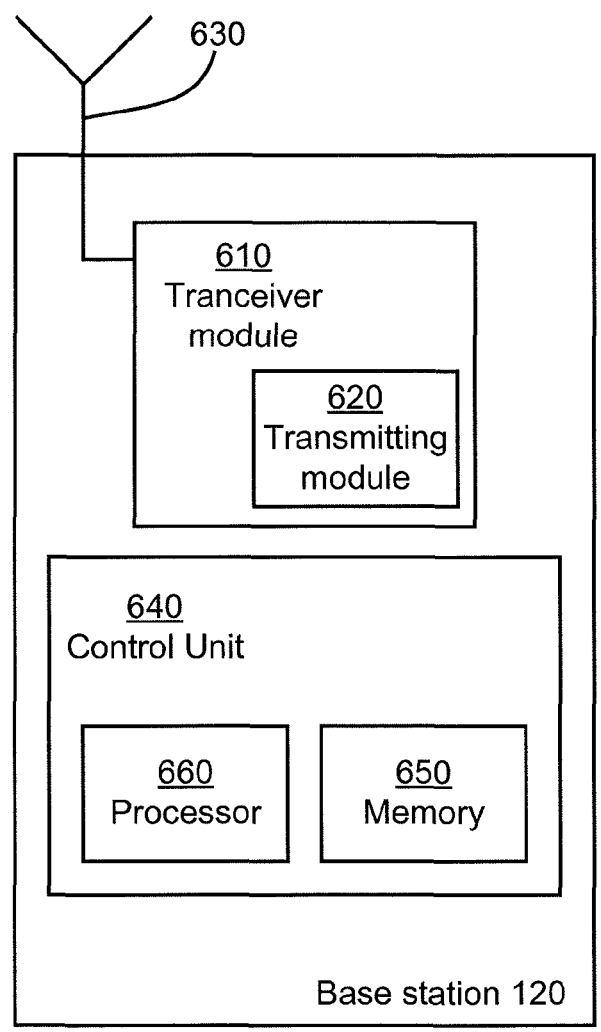
FIG. 6 is a schematic block diagram illustrating the base station according to some embodiments.

To perform the method actions for assisting a mobile terminal 110 in determining whether or not to transmit a connection request for a connection between the mobile terminal 110 and the base station 120 described above in relation to FIG. 4, the base station 120 may comprises the following arrangement depicted in FIG. 6. As mentioned above, the base station 120 is movable.

The base station 120 comprises a transceiver module 610 comprising a transmitting module 620. The transceiver module 610 handles communications between the base station 120 and the mobile terminal 110. The transmitting module 620 handles downlink traffic and an antenna 630 is connected to the transceiver module 610.

The base station 120 comprises control unit 640, adapted to transmit the information about a duration to the mobile terminal 110 indicating an amount of time during which the base station 120 should be detected by the mobile terminal 110 before the mobile terminal 110 transmits a connection request to the base station 120.

In some embodiments the duration is defined by a time period.

In some embodiments the duration is defined by a number of synchronization signals.

In some embodiments, the control unit 640 may be implemented as a dedicated application-specific hardware unit. Alternatively, said control unit 640, or parts thereof, may be implemented with programmable and/or configurable hardware units, such as but not limited to one or more FPGAs, processors, or microcontrollers. Thus, the control unit 640 may be a programmable control unit. The mobile terminal 110 may further comprise a memory module 650 comprising one or more memory units. The memory module 650 may comprise instructions executable by the programmable control unit 640.

The memory module 650 may be arranged to be used to store, data, configurations, schedulings, and applications to perform the methods herein when being executed in the mobile terminal 110.

The embodiments herein handling the process of determining connection establishment may be implemented through one or more processors, such as the control unit 550 or a processor 580 in the mobile terminal 110 and the control unit 640 in or a processor 660 the baser station 1230 depicted in FIG. 5 and FIG. 6, together with computer program code for performing the functions and actions of the embodiments herein. The program code mentioned above may also be provided as a computer program product, for instance in the form of a data carrier carrying computer program code for performing the embodiments herein when being loaded into the in the mobile terminal 110 or the base station 120. One such carrier may be in the form of non-transitory computer-readable medium, such as a CD ROM disc, a memory stick, flash memory, etc. The computer program code may furthermore be provided as pure program code on a server and downloaded to the base station 120 or the mobile terminal 110.

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the embodiments should not be taken as limiting the scope of the invention, which is defined by the appending claims.

The invention claimed is:

1. A method in a mobile terminal for determining whether or not to transmit a connection request for a connection between the mobile terminal and a base station, where the base station is moving, the method comprising:
   determining an indication of a relative speed between the mobile terminal and the detected base station; and
   determining based on the indication of the relative speed whether or not to transmit the connection request to the base station, and wherein a determination to transmit the connection request is made when the determined indication of the relative speed between the mobile terminal and the base station indicates that the relative speed is below a first threshold; and
   determining a duration during which the base station has been detected by the mobile terminal; wherein
   the determination to transmit the connection request is made when the determined duration exceeds a fourth threshold, and
   wherein determining the duration during which the base station has been detected by the mobile terminal is performed by
   determining a number of synchronization signals received from the base station.

2. The method according to claim 1, further comprising:
   determining an indication of an absolute speed of the mobile terminal; and wherein
   the determination to transmit the connection request is made when the indication of the absolute speed of the mobile terminal indicates that the absolute speed of the mobile terminal is larger than a second threshold.

3. The method according to claim 1, further comprising:
   determining an indication of an absolute speed of the base station; and wherein
   the determination to transmit the connection request is made when the indication of the absolute speed of the base station indicates that the absolute speed of the base station is larger than a third threshold.

4. The method according to claim 1, comprising:
   receiving information about the duration from the base station.

5. The method according to claim 1, where the base station is a Wireless Local Area Network Access Point, and the synchronization signals received from the base station are beacon signals received from the Wireless Local Area Network Access Point.

6. A mobile terminal configured to determine whether or not to transmit a connection request for a connection between the mobile terminal and a base station where the base station is movable, the mobile terminal comprises control unit configured to:
   when detecting the base station, determine an indication of a relative speed between the mobile terminal and the detected base station; and
   determine based on the indication of the relative speed whether or not to transmit the connection request to the base station, and where a determination to transmit the connection request is made when the determined indication of the relative speed between the mobile terminal and the base station indicates that the relative speed is below a first threshold,
   wherein the control unit is further configured to:
   determine a duration during which the base station has been detected by the mobile terminal; and wherein
   the determination to transmit the connection request is made when the determined duration exceeds a fourth threshold, and
   wherein the control unit is further configured to:
   determine the duration during which the base station has been detected by the mobile terminal by determining a number of synchronization signals received from the base station.

7. The mobile terminal according to claim 6, wherein the control unit is further configured to:
   determine an indication of an absolute speed of the mobile terminal; and wherein
   the determination to transmit the connection request is made when the indication of the absolute speed of the mobile terminal indicates that the absolute speed of the mobile terminal is larger than a second threshold.

8. The mobile terminal according to claim 6, wherein the control unit is further configured to:
   determine an indication of an absolute speed of the base station; and wherein
   the determination to transmit the connection request when the indication of the absolute speed of the base station indicates that the absolute speed of the base station is larger than a third threshold.

9. The mobile terminal according to claim 6, wherein the control unit is further configured to:
receive information about the duration from the base station.

10. The mobile terminal according to claim 6, wherein the base station is a Wireless Local Area Network Access Point, and the synchronization signals received from the base station are beacon signals received from the Wireless Local Area Network Access Point.

11. The mobile terminal according to claim 6,
wherein the control unit comprises a processor and a memory, and wherein said memory comprises instructions executable by said processor.

12. A method in a base station for assisting a mobile terminal in determining whether or not to transmit a connection request for a connection between the mobile terminal and the base station where the base station is moving, the method comprising:
transmitting an information to the mobile terminal about duration during which the base station shall be detected by the mobile terminal before the mobile terminal transmits a connection request to the base station enabling the mobile terminal to determine whether or not to transmit the connection request based on the transmitted duration,
wherein the duration is defined by a number of synchronization signals, and wherein the duration is an amount of time over which an ability of the mobile terminal to receive signals from the base station is an indication that the mobile terminal and the base station are moving jointly.

13. A base station configured to assist a mobile terminal in determining whether or not to transmit a connection request for a connection between the mobile terminal and the base station where the base station is movable, the base station comprising control unit configured to:
transmit an information about a duration to the mobile terminal indicating an amount of time during which the base station shall be detected by the mobile terminal before the mobile terminal transmits a connection request to the base station,
wherein the duration is defined by a number of synchronization signals, and wherein the duration is an amount of time over which an ability of the mobile terminal to receive signals from the base station is an indication that the mobile terminal and the base station are moving jointly.

* * * * *